(12) United States Patent
Hower et al.

(10) Patent No.: US 11,442,676 B2
(45) Date of Patent: Sep. 13, 2022

(54) CORRUGATOR CONTROL INFORMATION ON A BOX LINER

(71) Applicant: Hewlett-Packard Development Company, L.P., Houston, TX (US)

(72) Inventors: Jason Hower, Corvallis, OR (US); Frank Perdicaro, Corvallis, OR (US); Mun Yew Lee, San Diego, CA (US); Bryan Crampton, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 307 days.

(21) Appl. No.: 15/760,319

(22) PCT Filed: Jan. 28, 2016

(86) PCT No.: PCT/US2016/015471
§ 371 (c)(1),
(2) Date: Mar. 15, 2018

(87) PCT Pub. No.: WO2017/131720
PCT Pub. Date: Aug. 3, 2017

(65) Prior Publication Data
US 2018/0253263 A1    Sep. 6, 2018

(51) Int. Cl.
*B41J 3/28* (2006.01)
*G06F 3/12* (2006.01)
*B41J 3/01* (2006.01)
*B41J 15/04* (2006.01)
*B41J 2/01* (2006.01)

(52) U.S. Cl.
CPC ............... *G06F 3/125* (2013.01); *B41J 2/01* (2013.01); *B41J 3/01* (2013.01); *B41J 3/28* (2013.01); *B41J 15/04* (2013.01); *G06F 3/1208* (2013.01); *G06F 3/1287* (2013.01)

(58) Field of Classification Search
None
See application file for complete search history.

(56) References Cited

U.S. PATENT DOCUMENTS 5,324,383 A * 6/1994 Lang .................. B31F 1/2822
                                                156/470
6,125,374 A * 9/2000 Terry .................. G06T 17/05
                                                715/234

(Continued)

FOREIGN PATENT DOCUMENTS

CN    101058244    10/2007
CN    103879026    6/2014

(Continued)

OTHER PUBLICATIONS

HP High-speed Inkjet Corrugated Packaging Solution, Available Online at: <Http://h20195.www2.hp.com/v2/getpdf.aspx/4aa5-3200enw.pdf>.

*Primary Examiner* — Alejandro Valencia
(74) *Attorney, Agent, or Firm* — Dierker & Kavanaugh PC

(57) ABSTRACT

In one example, a printing system includes a print engine and a print engine controller operatively connected to the print engine to print, on a single substrate web, graphics for multiple different layouts of corrugated boxes to be lined with the web and machine readable images representing corrugator control information for making the multiple different layouts.

10 Claims, 4 Drawing Sheets

(56) References Cited

U.S. PATENT DOCUMENTS

| | | | |
|---|---|---|---|
| 7,182,007 B2 | 2/2007 | Berge et al. | |
| 7,326,168 B2 * | 2/2008 | Kocherga | B31F 1/08 |
| | | | 493/150 |
| 7,559,279 B2 | 7/2009 | Brandenburg et al. | |
| 8,096,241 B2 | 1/2012 | Steinbacher | |
| 8,690,057 B2 | 4/2014 | Schoening et al. | |
| 9,539,828 B2 | 1/2017 | Yasinover et al. | |
| 2004/0182503 A1 | 9/2004 | Stadele | |
| 2008/0002011 A1 | 1/2008 | Mizutani et al. | |
| 2008/0309496 A1 | 12/2008 | Mure | |
| 2012/0243020 A1 | 9/2012 | Saito | |
| 2013/0029825 A1 | 1/2013 | Rich | |
| 2013/0286072 A1 | 10/2013 | Armbruster et al. | |
| 2013/0292030 A1 | 11/2013 | Schindler, II | |
| 2014/0038802 A1 * | 2/2014 | Clark | B26D 5/00 |
| | | | 493/11 |
| 2014/0307020 A1 | 10/2014 | Toriihara et al. | |
| 2014/0378285 A1 | 12/2014 | Nadachi et al. | |
| 2018/0345619 A1 | 12/2018 | Lang et al. | |

FOREIGN PATENT DOCUMENTS

| | | |
|---|---|---|
| DE | 102015219630 A1 | 3/2017 |
| EP | 0554989 | 8/1993 |
| EP | 1459878 A2 | 9/2004 |
| EP | 1559520 A2 | 8/2005 |
| EP | 2551117 | 1/2013 |
| EP | 3156199 A2 | 4/2017 |
| EP | 3305486 A1 | 4/2018 |
| EP | 3337666 B1 | 12/2020 |
| GB | 2542569 | 3/2017 |
| JP | 2002052631 | 2/2002 |
| JP | 2007160846 | 6/2007 |
| WO | 2005/108027 A1 | 11/2005 |
| WO | 2013/023844 A1 | 2/2013 |
| WO | WO-2014206496 | 12/2014 |
| WO | 2016/008969 A1 | 1/2016 |
| WO | 2016/008993 A1 | 1/2016 |
| WO | 2017/026135 A1 | 2/2017 |
| WO | WO 2017/051146 | 3/2017 |

* cited by examiner

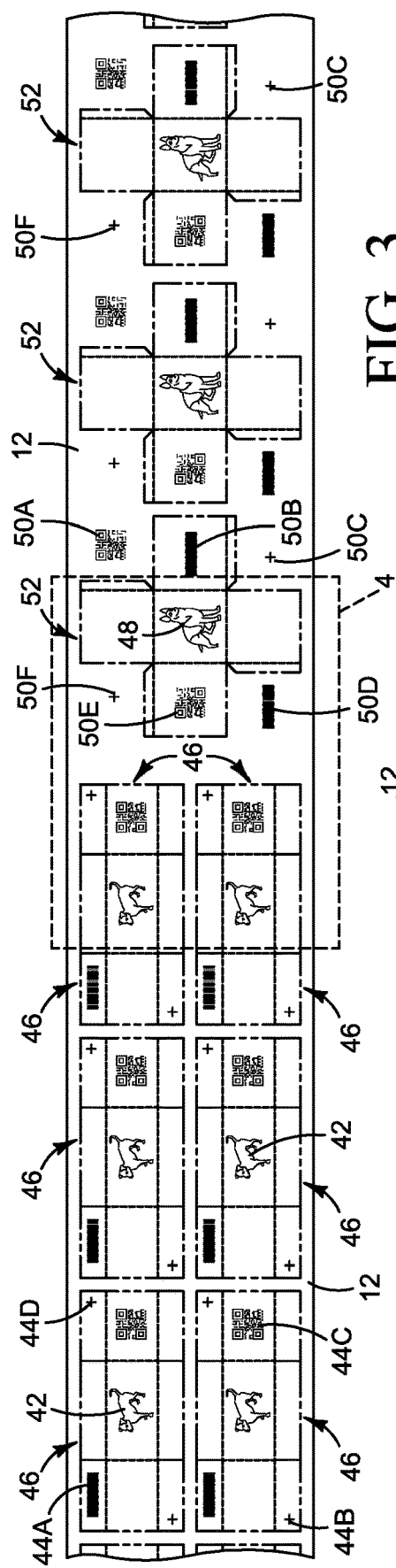
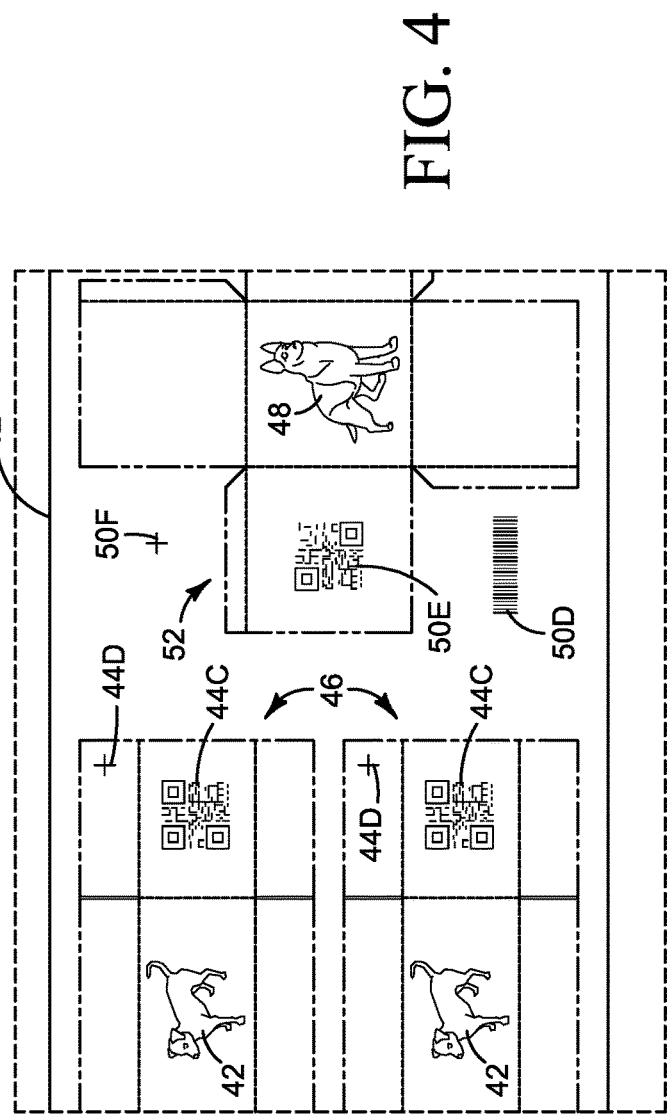

CORRUGATOR CONTROL INFORMATION ON A BOX LINER

BACKGROUND

Corrugated boxes are sometimes manufactured using rolls of liner material pre-printed with graphics and other images. Liners are laminated to a flute in the corrugating machine to form a continuous web of corrugated board, and individual boxes are cut from the web. In some box manufacturing processes, the board is cut down-web into two lanes, each lane cut into ribbons, and each ribbon chopped into rectangular sheets. The board sheets are fed to a die for cutting and creasing. A single die cut operation may produce one or multiple box blanks. A corrugating machine is commonly referred to as a "corrugator." Cut and creased but unfolded boxes are commonly referred to as box "blanks."

DRAWINGS

FIG. 3 is a plan view illustrating one example of a box liner printed with box graphics and corrugator control information for multiple different box layouts, such as might be printed with a printing system shown in FIGS. 1 and 2.

FIG. 4 is a detail of a portion of the example box liner shown in FIG. 3.

Figure 8:
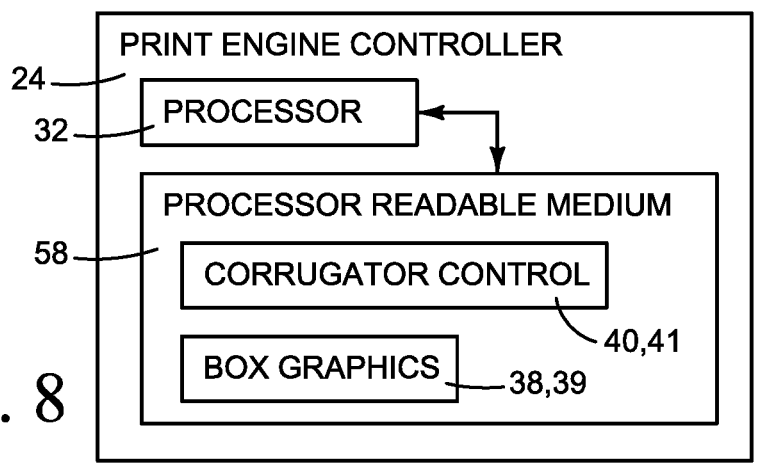
Figure 9:
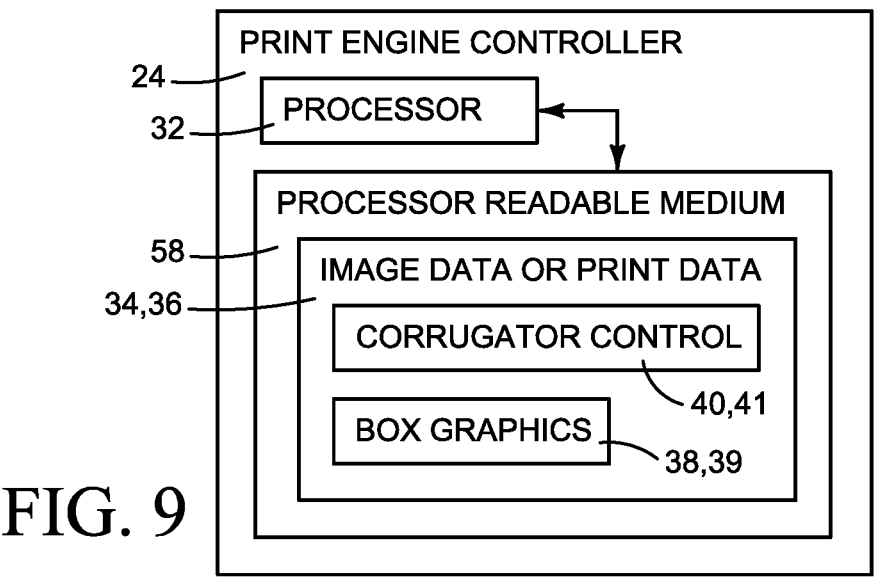

FIG. 8 is a block diagram illustrating one example of a processor readable medium with image data to print machine readable images representing corrugator control information for multiple different box layouts on a single web of liner material FIG. 9 is a block diagram illustrating a print engine controller that includes the example processor readable medium with image data or print data to print box graphics and machine readable images representing corrugator control information for multiple different box layouts on a single web of liner material.

The same part numbers designate the same or similar parts throughout the figures. The figures are not necessarily to scale.

DESCRIPTION

Corrugators cut and crease individual box blanks from a web or sheet of corrugated board according to a corrugator plan with instructions that tell the corrugator the layout of the boxes, including, for example, where to make cuts and creases for the size and shape of each box. Currently, when the layout of the box changes, a new roll of liner material printed with the corresponding images is loaded into the corrugator along with a new corrugation plan. Digital web printing systems are capable of printing box liners for multiple different box layouts on a continuous web of liner material in a single roll. In order to use a single roll of liner material printed for different box layouts, it may be desirable to automatically reconfigure the corrugator plan and corresponding cutting and creasing instructions for each layout on the web.

Accordingly, in one example, a new digital web printing system includes a print engine and a print engine controller operatively connected to the print engine to print, on a single substrate web, (1) graphics for multiple different layouts of corrugated boxes to be lined with the web and (2) machine readable images representing corrugator control information for making the multiple different box layouts. The corrugator control information printed on the liner may be read by an optical scanner or other sensor in the corrugator's computer control system, for example, to configure (or reconfigure) the corrugator plan with cutting and creasing instructions for each of the different box layouts. In one implementation, corrugator control information printed on the liner includes an identification that associates each of the different layouts with a corrugator plan for the layout. In another implementation, corrugator control information printed on the liner includes the actual instructions to cut and crease each box layout.

These and other examples described below and shown in the figures illustrate but do not limit the scope of the patent, which is defined in the Claims following this Description.

As used in this document: "and/or" means at least one of the connected things; a "box" means a box whether or not it is folded, including what is commonly referred to as a "blank"; "crease" means to crease or score or otherwise make a fold line; a "graphic" means a human readable image (that could be machine readable too); and "layout" means the size and/or shape of a box.

Figure 1:
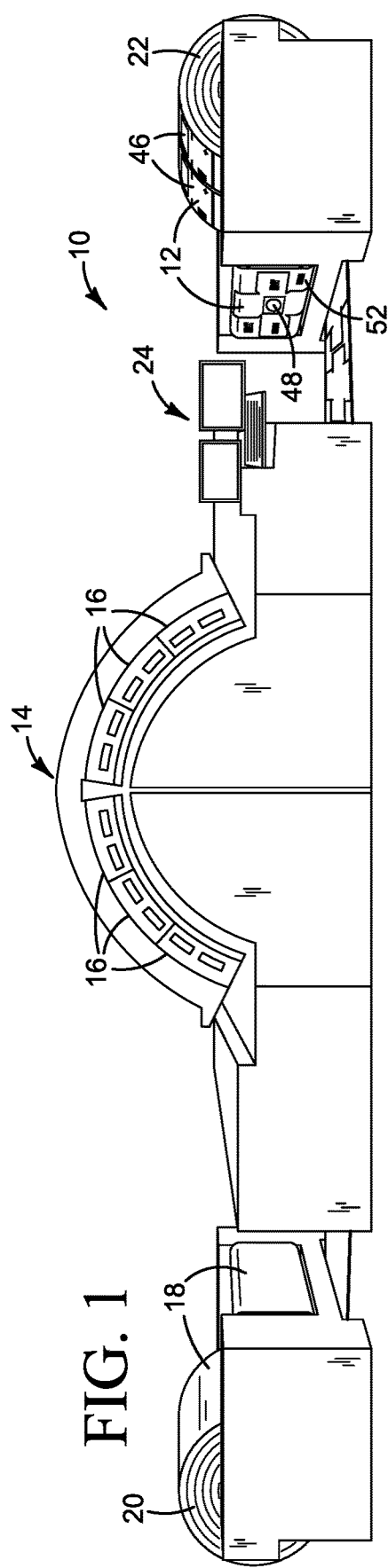
FIG. 1 is an exterior perspective illustrating one example of a printing system to print a corrugated box liner with box graphics and corrugator control information for multiple different box layouts.
Figure 2:
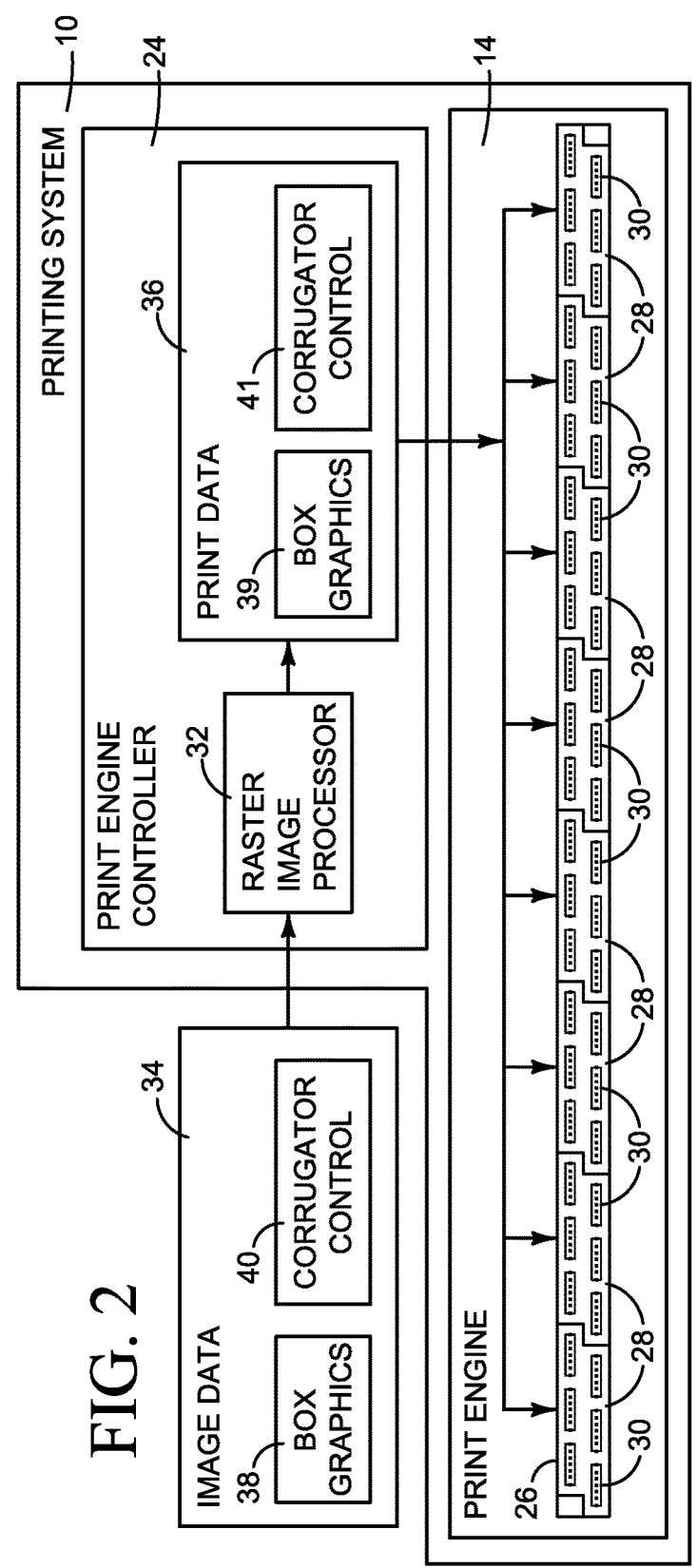
FIG. 2 is a block diagram illustrating one example of a printing system to print a corrugated box liner with box graphics and corrugator control information for multiple different box layouts.
Figure 5:
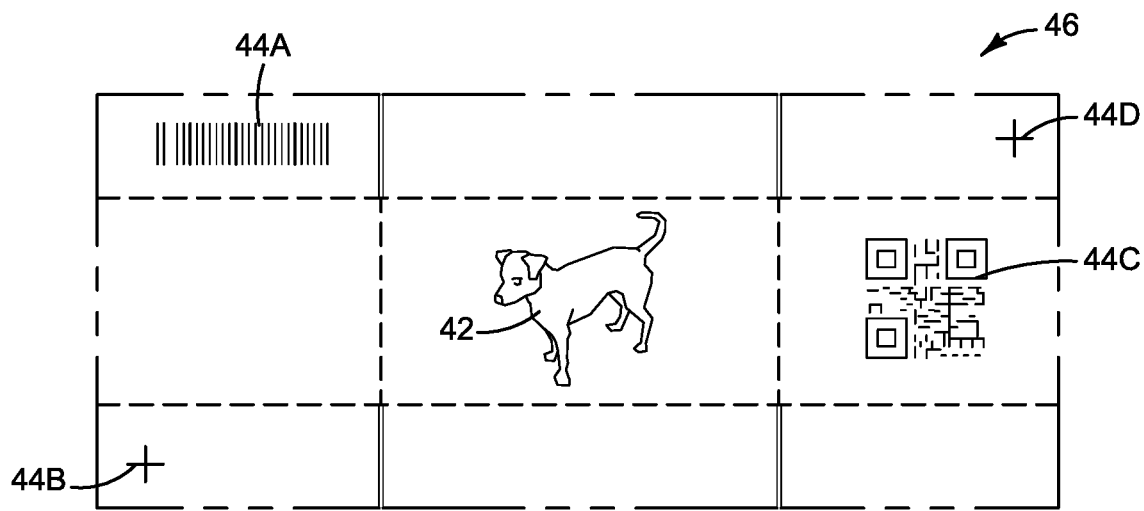
FIGS. 5 and 6 are plan views showing, respectively, each of the multiple different box layouts on the example liner shown in FIG. 3.
Figure 6:
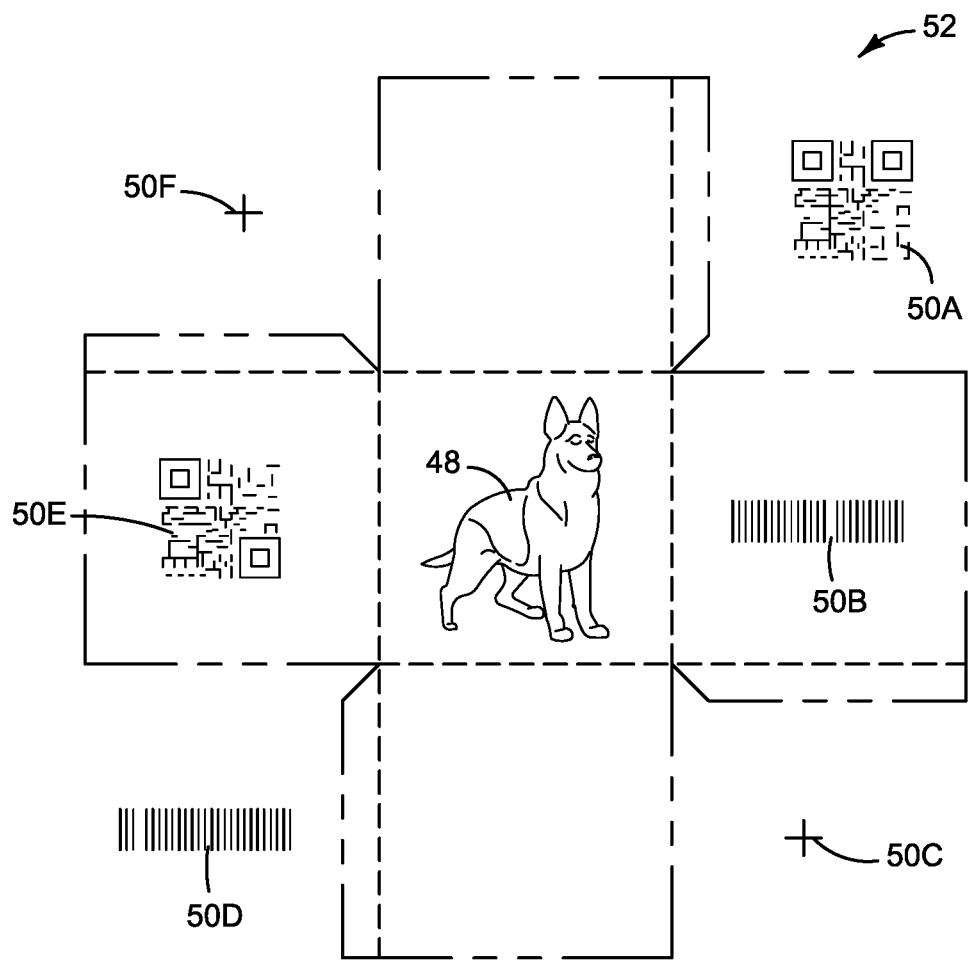

FIG. 1 is an exterior perspective and FIG. 2 is a block diagram each illustrating one example of a printing system 10 to print a corrugated box liner 12 with box graphics and corrugator control information together concurrently for multiple different box layouts on a single web of liner material. FIG. 3 is a plan view illustrating one example of a box liner 12 such as might be printed with a printing system 10 shown in FIGS. 1 and 2. FIG. 4 is a detail from liner 12 in FIG. 3, and FIGS. 5 and 6 show each of the individual box layouts printed on liner 12.

Referring first to FIG. 1, printing system 10 includes an arched print engine 14 with printing units 16 to apply imaging material to a printable substrate web 18 made of box liner material. While any suitable printing technology and imaging material may be used to implement a print engine 14, the arched configuration shown in FIG. 1 is used in some high-speed inkjet web printing systems with a series of web-wide printing units 16. A single continuous web 18 of box liner material is supplied to print engine 14 from a supply roll 20 and the printed liner 12 is taken up on a take-up roll 22. The unprinted web of liner material is called out as web 18 and the printed web of liner material is called out as liner 12.

Referring now also to FIG. 2, printing system 10 includes a print engine controller 24 operatively connected to print engine 14. Controller 24 in FIGS. 1 and 2 represents generally the programming, processors and associated memories, and the electronic circuitry and components needed to control the operative elements of print engine 14. In the example shown in FIG. 2, print engine 14 is implemented as a modular print bar 26 that includes a series of printhead modules 28 each with multiple printheads 30, such as might be used in each of the arched printing units 16 shown in FIG. 1. Also in the example shown in FIG. 2, controller 24 includes a raster image processor 32 to receive image data 34, convert image data 34 to print data 36, and transmit print data 36 to print engine 14.

Raster image processor 32 and other image processing components in a print engine controller 24 for a high-speed digital printing system are sometimes referred to collectively as a "digital front end." As part of the process of rendering image data for use by the print engine, a digital front end may perform color conversion, mapping, halftoning and other functions to enable the print engine to form the desired images at the proper locations on the print substrate. Accordingly, a print engine controller 24 in printing system 10 may include programming, processing and/or data components not shown in the block diagram of FIG. 2.

Referring specifically to FIG. 2, image data 34 includes graphics data 38 and corrugator control data 40. Graphics data 38 represents the graphics to be printed on web 18 for boxes with different layouts. Control data 40 represents machine readable images with corrugator control information to be printed on web 18 to make the boxes with different layouts. Print data 36 also includes the now rasterized graphics data 39 and corrugator control data 41. FIGS. 3 and 4 illustrate a web liner 12 printed by a system 10 based on print data 36. As shown in FIGS. 3 and 4, web liner 12 is printed concurrently with both a graphic 42 and machine readable images 44A-44D with corrugator control information for a first box layout 46, and with a graphic 48 and machine readable images 50A-50F with corrugator control information for a second box layout 52. A detail of box layout 46 is shown in FIG. 5. A detail of box layout 52 is shown in FIG. 6.

The layout for each box 46, 52 is depicted with phantom lines where the corrugator is to make cuts and dashed lines where the corrugator is to make creases (at the folds). Box layouts 46, 52 are not actually printed on liner 12, but are shown to help illustrate images 42, 44 and 48, 50 for the corresponding box layouts 46, 52. Part numbers 46, 52 in FIG. 3 designate the individual boxes as well as the different box layouts. Also, while two different box layouts are shown on that portion of liner 12 included in FIG. 3, liner 12 may include more than two different box layouts. In the example shown in FIGS. 3-6, machine readable images 44, 50 for box layouts 46, 52, respectively, include barcodes 44A, 50B, 50D, registration marks 44B, 44C, 50C, 50F, and matrix barcodes 44C, 50A, 50E. Some of the images 44, 50 printed on liner 12 may be used exclusively for corrugator control, some used exclusively for other than corrugator control, and some used for both corrugator control and other than corrugator control.

In one implementation, machine readable images 44A-44D and 50A-50F on each box include an identification that associates a single box or a single group of boxes on liner 12 with a corrugation plan for the box or group of boxes. For example, a barcode 44A, 50D on each layout may be used to identify the respective layout 46, 52 to the corrugator. Accordingly, when the optical scanner or other sensor in the corrugator's computer control system reads a barcode 44A or 50D, the system can execute cutting and creasing instructions in the plan associated with the corresponding box layout.

In another implementation, the machine readable images 44A-44D and 50A-50F on each box include the corrugation plan itself, or at least instructions to properly cut and crease the respective box layout 46, 52. For example, a matrix barcode 44C, 50A on each layout may convey cutting and creasing instructions to the corrugator for the respective layout 46, 52. Accordingly, when the optical scanner or other sensor in the corrugator's computer control system reads a matrix barcode 44C or 50A, the system can execute cutting and creasing instructions for the corresponding box layout.

Machine readable images 44A-44D and 50A-50F on each box may include other or different corrugator control information from that described above. For one example, one of the images may include an identification that uniquely identifies a single box or single group of boxes to the corrugator. For another example, one of the images may include an indication of the location of the box or group of boxes on the printed web. Box ID and location information may be used by the corrugator to execute the cutting and creasing instructions corresponding to the layout for that box or group of boxes, for example in conjunction with a liner roll map that maps box ID and location information on the liner to a corrugator plan with the desired cutting and creasing instructions. Corrugator control images 44A-44D and 50A-50F may be located inside the box layout, for example barcode 44A and matrix barcode 44C in layout 46, and/or outside the box layout, for example matrix barcode 50A and barcode 50D in layout 52. The configuration and characteristics of the graphics and machine readable images shown in the FIGS. 3-6 are just one example. Other configurations and characteristics for both the graphics and the corrugator control information are possible.

Corrugator control information printed on a liner 12 usually also will include registration marks, for example registration marks 44B, 44D and 50C, 50F shown in FIGS. 3-6. Registration marks 44B, 44D and 50C, 50F can be used by the corrugator control system to help accurately locate the corrugated board (with liner 12) relative to the cutting and creasing dies. The positional information depicted by the registration marks may be sensed and then processed "on the fly" to dynamically adjust the position of the corrugated board and/or the position of the dies to correct for any misalignment in the system for each of the different box layouts 46, 52 on liner 12.

Figure 7:
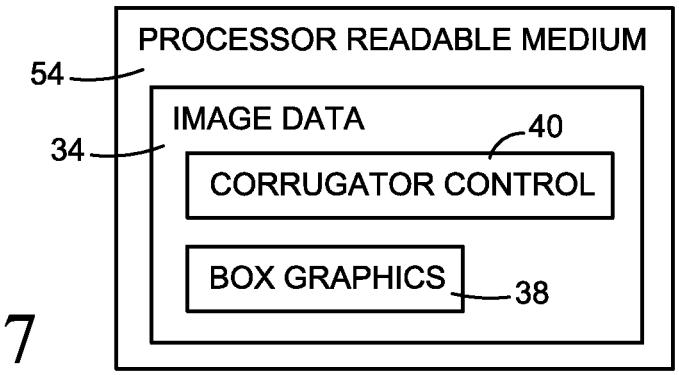
FIG. 7 is a block diagram illustrating one example of a processor readable medium with image data to print box graphics and machine readable images representing corrugator control information for multiple different box layouts on a single web of liner material.

The layout of each of the multiple different boxes and the corresponding graphics and corrugator control images to be printed on the liner may be created with any suitable CAD (computer aided design) programming compatible with the corrugator control system(s) that will use the printed liner. Image data for the liner may be provided to the printing system in any suitable processor readable medium, for example as part of a normal "pre-press" workflow. Image data 34 with corrugator control information 40 may be provided together with box graphics 38, as shown on a processor readable medium 54 in FIG. 7, or separate from the box graphics as shown on a processor readable medium 56 in FIG. 8. If the image data for box graphics 38 and corrugator control information 40 is provided separately, the image data may be merged by print engine controller 24 before or after rasterizing, if desired, to generate integrated print data 36.

A processor readable medium 58 with image data 34 or print data 36 may be implemented in a print engine controller 24, as shown in FIG. 9.

A processor readable medium 54, 58 in the figures is any non-transitory tangible medium that can embody, contain, store, and/or maintain information for use by a processor.

The examples shown in the figures and described above illustrate but do not limit the scope of the patent, which is defined in the following Claims.

The invention claimed is:

1. A printing system to print corrugated box liners for multiple different corrugated box layouts on a continuous web of a liner material in a single roll for laminating to a flute in a corrugator, the printing system comprising:
   a print engine; and
   a print engine controller operatively connected to the print engine and programmed to print on the continuous web of the liner material in the single roll:
   a graphic for the multiple different corrugated box layouts; and
   machine readable images representing corrugator control information for making the multiple different corrugated box layouts.

2. The printing system of claim 1, where each machine readable image representing corrugator control information includes at least one of:
   an identification that uniquely identifies a single box or single group of boxes to a corrugator;
   an identification that associates a single box or single group of boxes with a corrugator plan;
   an indication of a location of a single box or single group of boxes on a printed web of the liner material; and
   an instruction to cut and/or crease a single box or single group of boxes on a printed web of the liner material.

3. The printing system of claim 1, where the multiple different layouts of boxes include multiple different size and/or shape boxes.

4. The printing system of claim 1, where the print engine controller is programmed to:
   receive graphic image data for the box layouts;
   convert the graphic image data to graphic print data; and
   transmit the graphic print data to the print engine to print the graphic on the continuous web of the liner material, based on the graphic print data, together with the machine readable images.

5. The printing system of claim 4, where the print engine controller is programmed to:
   receive corrugator control image data for the machine readable images with corrugator control information for making the different layouts of boxes;
   convert the corrugator control image data to control print data; and
   transmit the control print data to the print engine to print the machine readable images on the single web of box liner material, based on the control print data, together with the graphic.

6. The printing system of claim 5, where the print engine controller is programmed to:
   receive the corrugator control image data and the graphic image data together as integrated image data;
   convert the integrated image data to integrated print data; and
   transmit the integrated print data to the print engine to print the graphic and the machine readable images on the continuous web of the liner material based on the integrated image data.

7. The printing system of claim 1, where:
   the graphic includes multiple different graphics each for a single box or a single group of boxes different from any other box or group of boxes on the web; and
   the corrugator control information includes multiple single sets of corrugator control information each corresponding to one of the multiple different graphics.

8. The printing system of claim 2, where each machine readable image representing corrugator control information includes an identification that associates a single box or single group of boxes with a corrugator plan.

9. The printing system of claim 2, where each machine readable image representing corrugator control information includes an indication of a location of a single box or single group of boxes on a printed web of the liner material.

10. The printing system of claim 2, where each machine readable image representing corrugator control information includes an instruction to cut and/or crease a single box or single group of boxes on a printed web of the liner material.

* * * * *